Figure 1:
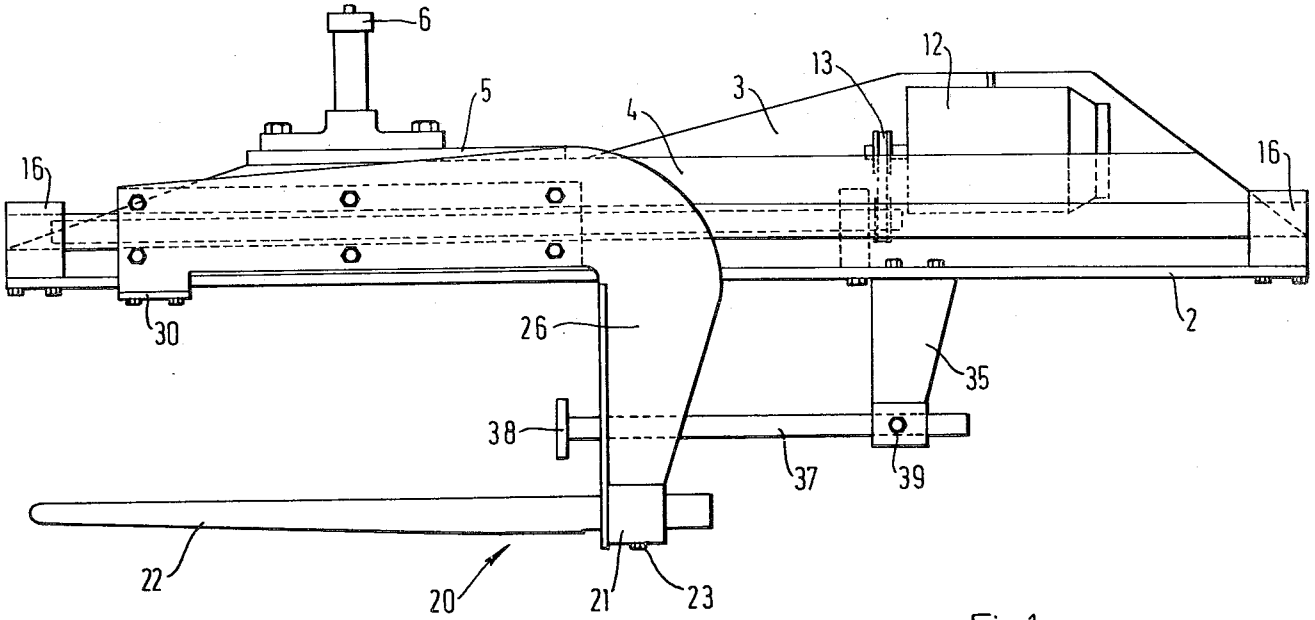
Figure 2:
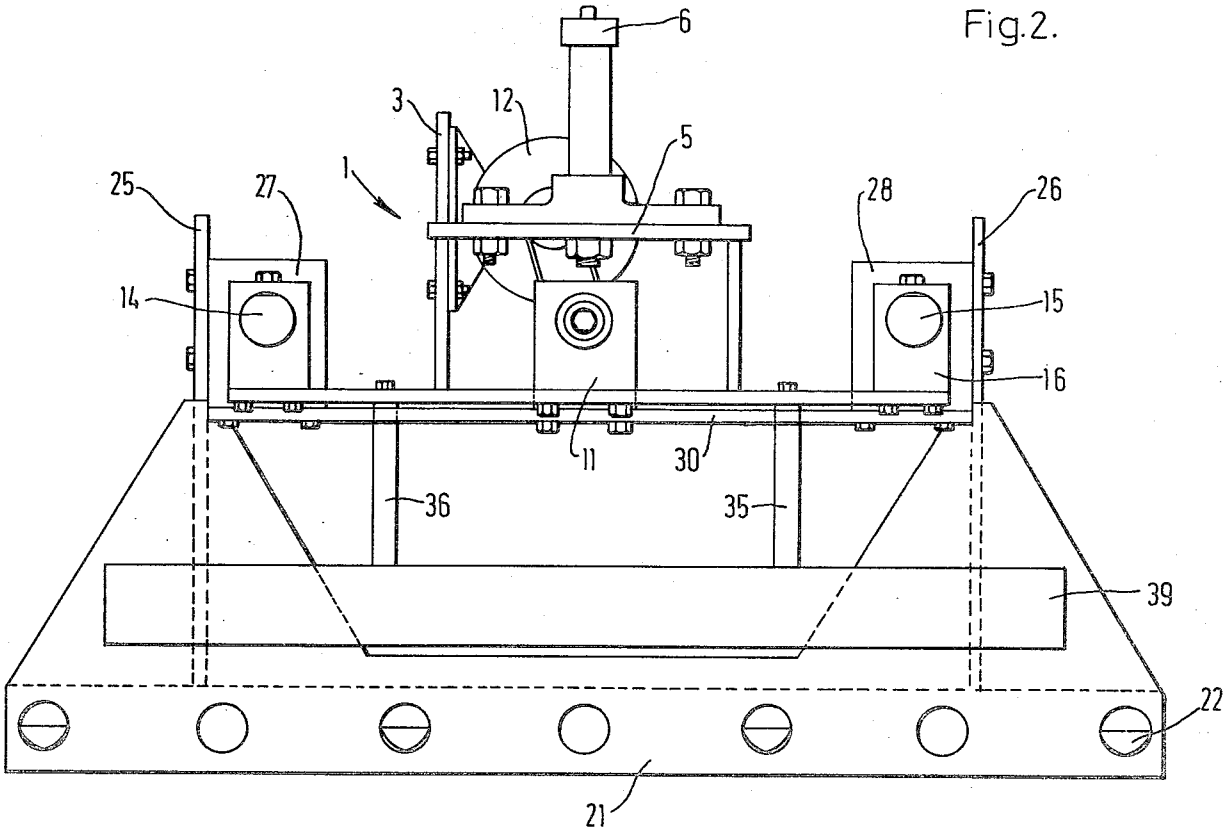
Figure 3:
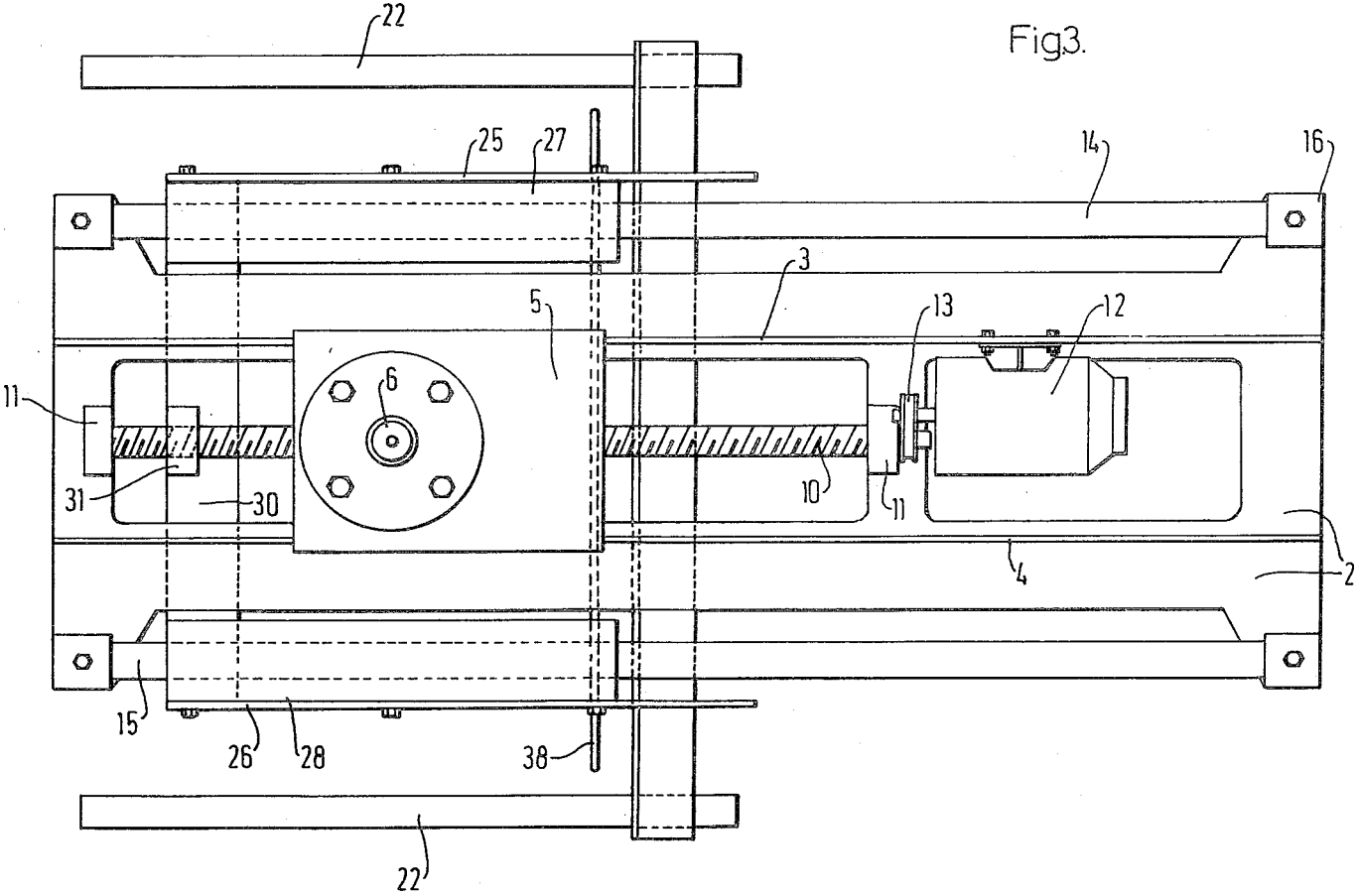

United States Defensive Publication [19] (H) [11] T999,001

Bevan [43] Oct. 7, 1980

[54] SACK HANDLING DEVICE

[76] Inventor: Ronald Bevan, "Whitehaven", 76 Hay St., Steeple Morden, Royston, Hertfordshire, England

[21] Appl. No.: 60,125

[22] Filed: Jul. 24, 1979

[30] Foreign Application Priority Data

Mar. 14, 1979 [GB] United Kingdom ..... 09052/79

[51] Int. Cl.[3] ..... B65G 57/10

[52] U.S. Cl. ..... 414/82

[57] ABSTRACT

A device for handling filled sacks in a stacking machine comprises a gantry; means for securing the gantry to a transportation device; a platform for supporting the filled sacks, suspended from the gantry so as to be moveable therealong between a forward position and a retracted position; and a fence mounted in a fixed position with respect to the gantry and located above the platform to act as a barrier against movement of any sacks supported on the platform as the latter is withdrawn from the forward to the retracted position.

1 Claim, 3 Sheets Drawing,

7 Pages Specification

The file of this unexamined application may be inspected and copies thereof may be purchased (849 O.G. 1221, Apr. 9, 1968).

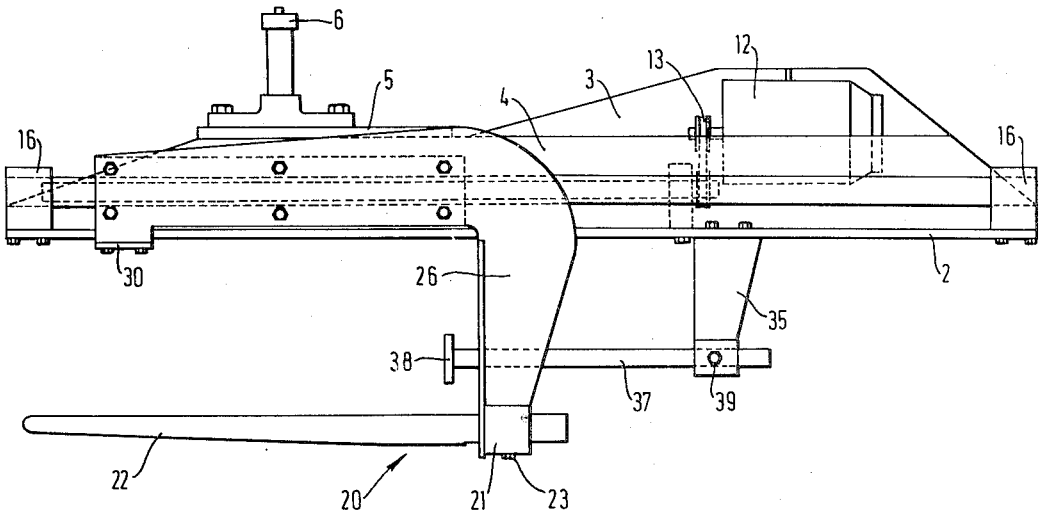

6
5
12
3
1
26
28
27
25
15
16
14
11
30
35
36
39
22
21